United States Patent [19]
Oden et al.

[11] Patent Number: 5,455,079
[45] Date of Patent: Oct. 3, 1995

[54] SURFACE HARDENING OF TITANIUM ALLOYS WITH MELTING DEPTH CONTROLLED BY HEAT SINK

[75] Inventors: Laurance L. Oden; Paul C. Turner, both of Albany, Oreg.

[73] Assignee: The United States of America as represented by the Secretary of the Interior, Washington, D.C.

[21] Appl. No.: 380,918

[22] Filed: Jan. 31, 1995

Related U.S. Application Data

[63] Continuation of Ser. No. 233,552, May 5, 1994, abandoned, which is a continuation of Ser. No. 736,344, Jul. 26, 1991, abandoned.

[51] Int. Cl.[6] .................................................. C23C 16/00
[52] U.S. Cl. .................... 427/450; 427/508; 427/540; 427/559; 427/569; 427/250; 427/318; 205/224; 205/228; 228/222; 228/50; 148/522
[58] Field of Search .................................. 427/450, 508, 427/540, 559, 569, 250, 318; 204/142.16; 205/224, 228; 228/222, 50

[56] References Cited

U.S. PATENT DOCUMENTS

| | | | |
|---|---|---|---|
| 3,765,954 | 10/1973 | Tokuda et al. | 428/660 |
| 4,157,923 | 6/1979 | Yen et al. | 148/4 |
| 4,212,900 | 7/1980 | Serlin | 427/376.8 |
| 4,372,989 | 6/1980 | Menzel | 427/555 |
| 4,946,749 | 8/1990 | Restoll et al. | 428/660 |
| 5,126,213 | 6/1992 | Restoll et al. | 428/660 |

*Primary Examiner*—Benjamin Utech

[57] ABSTRACT

A process for forming a hard surface coating on titanium alloys includes providing a piece of material containing titanium having at least a portion of one surface to be hardened. The piece having a portion of a surface to be hardened is contacted on the backside by a suitable heat sink such that the melting depth of said surface to be hardened may be controlled. A hardening material is then deposited as a slurry. Alternate methods of deposition include flame, arc, or plasma spraying, electrodeposition, vapor deposition, or any other deposition method known by those skilled in the art. The surface to be hardened is then selectively melted to the desired depth, dependent on the desired coating thickness, such that a molten pool is formed of the piece surface and the deposited hardening material. Upon cooling a hardened surface is formed.

31 Claims, No Drawings

SURFACE HARDENING OF TITANIUM ALLOYS WITH MELTING DEPTH CONTROLLED BY HEAT SINK

This application is a continuation of application Ser. No. 08/233,552, filed May 5, 1994, abandoned, which is a continuation of application Ser. No. 07/736,344 filed Jul. 26, 1991, now abandoned.

BACKGROUND OF THE INVENTION

1. Technical Field

The present invention is directed to coating processes and more particularly to a process adapted to form hard surfaces on titanium and titanium alloys.

2. Description of the Prior Art

Hard surface coatings are known to improve the resistance to wear and abrasion of ferrous alloys and to improve the ballistic efficiency of conventional ferrous alloy armors. The prior art teaches methods for forming hard surfaces on titanium. However, these methods are capable of forming only very thin coatings (a few thousands of an inch). Such prior art coatings are known as "alpha case" and are formed in the normal course of casting titanium and its alloys into reactive mold materials. Nonetheless, alpha case is undesirable in all but armor applications.

Additionally, the prior art teachings do not disclose a method capable of forming relatively thick (0.31 to 1.27 cm) hard surfaces on titanium and titanium alloys. Further, the prior art teachings produce a thin hard surface with a limited ballistic coefficient.

3. Objects of the Invention

Therefore, a principal object of the present invention is to provide an improved process for forming a hard surface coating on titanium and titanium alloys.

Another object of the present invention is to provide a process for forming a hard surface coating on titanium and titanium alloys capable of selectively forming relatively thick hard surfaces on both titanium and titanium alloys.

Another object of the present invention is to provide a process for forming a hard surface coating on titanium and titanium alloys which has an improved ballistic coefficient.

Another object of the present invention is to provide a process for forming a hard surface coating on titanium and titanium alloys which provides for significant weight savings allowing for decreased body loads for personnel, decreased fuel consumption for motorized devices, and improve the unit carrying capacity of transportation devices including land vehicles, ships, and flying machines.

Another object of the present invention is to provide a process for forming a hard surface coating on titanium and titanium alloys which is economical to produce.

Another object of the present invention is to provide a process for forming a hard surface coating on titanium and titanium alloys wherein a heat sink is provided on the backside of the surface to be hardened to control the melting depth.

Another object of the present invention is to provide a process for forming a hard surface coating on titanium and titanium alloys which may be adapted for use by military and law enforcement entities.

Another object of the present invention is to provide a process for forming a hard surface coating on titanium and titanium alloys which allows for the use of thinner sections for a given threat.

Finally, another object of the present invention is to provide a process for forming a hard surface coating on titanium and titanium alloys that provides better protection from projectiles than traditional materials at a significant weight savings. These and other objects will be apparent to those skilled in the art.

SUMMARY OF THE INVENTION

The present invention discloses a process for forming a hard surface coating on titanium and titanium alloys. The process includes providing a piece of material containing titanium having at least a portion of one surface to be hardened. The piece having a portion of a surface to be hardened is contacted on the backside by a suitable heat sink such that the melting depth of the surface to be hardened may be controlled.

A hardening material is then deposited onto the surface to be hardened. This may be done by slurry, flame, arc, or plasma spraying, electrodeposition, vapor deposition, or any other deposition method known by those skilled in the art.

The surface to be hardened is then selectively melted to the desired depth, dependent on the desired coating thickness, such that a molten pool is formed of the piece surface and the deposited hardening material. Upon cooling a hardened surface is formed.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DESCRIPTION OF THE PREFERRED EMBODIMENT

The present invention teaches a novel process for hardening surface areas of titanium and titanium alloys. The process produces titanium and titanium alloy surfaces having markedly improved ballistic efficiencies when used as armor. Additionally, hard surfacing of titanium and titanium alloys generally improves surface resistance to erosion and wear.

In situations where titanium is advantageously used to decrease weight, such as shoes on tracked vehicles and blades on earth moving equipment (which must be light and mobile), application of a hardened surface can significantly increase service life.

Further, it is in the best interest of the Government and of the citizens of the United States to provide the best available armor in all conditions where a threat to the safety of personnel and equipment exists. Titanium and its alloys provide better protection from projectiles than many traditional materials at a significant weight savings. The addition of a hard surface on titanium and titanium alloys significantly improves the ballistic efficiency, thereby allowing the use of thinner sections for a given threat.

The present invention discloses a process for forming a hard surface on titanium and titanium alloys by the incorporation of various elements or compounds into the surface to be hardened. The various materials can be incorporated into the surface to be hardened by selectively melting the surface to the desired depth. The hardening materials can be incorporated into the surface by single or multiple melting operations that may be interrupted by the application of additional hardening materials. The hardening materials include, but are not limited to boron, carbon, nitrogen, oxygen, silicon, combinations thereof, such as $B_4C$ or SiC, and compounds containing those elements, such as $TiB_2$, TiC, TiN, or $Ti_5Si_3$.

Prior to surface melting, the hardening materials can be applied to the surface as a simple slurry of the appropriate material in a suitable carrier. Alternatively, prior to surface melting, the hardening material can be applied by flame, arc, or plasma spraying, electrodeposition, or chemical or physical vapor deposition. Other processes of deposition familiar to anyone versed in the art are also claimed.

Melting of the surface can be accomplished by the preferred method of arc melting in an atmosphere of inert gas, but plasma melting, electron beam melting, laser melting, or other methods of melting familiar to anyone skilled in the art.

It is important to provide an efficient method to remove heat from the titanium or titanium alloy piece during melting of the surface. Heat removal is necessary to control the depth of the molten pool and to maintain the integrity of the unmelted substrate material. Means to accomplish heat removal include water cooling of the backside of the piece or clamping of the piece to a suitable heat sink with an effective heat transfer medium between piece and heat sink. Appropriate heat transfer materials include tin, indium, tin-indium alloys, other alloys melting in the range between 50° to 300° C., and other effective heat transfer mediums familiar to anyone skilled in the art.

A heat-treating operation advantageously may be applied following the melting operation to obtain optimum mechanical properties in the hardened surface and in the unmelted substrate metal.

In all cases, the quantity of hardening material applied must provide the desired concentration in the hardened surface layer after melting. Examples of hardening materials and preferred ranges of composition within the hardened surface layer are the following:

Boron: Boron forms two hard and refractory compounds with titanium; $TiB_2$ melts at 3,225° C. and TiB melts at 2,190° C. TiB and Ti form a low-melting eutectic at 1,540° C. and 7 atom percent boron-93 atom percent titanium. Boron can be applied as the element or compound such as $TiB_2$ or TiB. The appropriate composition range within the hardened surface layer varies from 2 atom percent boron-98 atom percent titanium to 25 atom percent boron-75 atom percent titanium. The preferred composition of the hardened surface is 17 atom percent boron-83 atom percent titanium.

Carbon: Titanium forms a carbide, nominally TiC, that melts at 3,067° C. TiC and Ti form a low-melting eutectic at 1,650° C. and 1.5 atom percent carbon-98.5 atom percent titanium. Carbon can be applied as the element or compound such as TiC. The appropriate composition range within the hardened surface layer is 2 atom percent carbon-98 atom percent titanium to 22 atom percent carbon-78 atom percent titanium. The preferred composition of the hardened surface layer is 10 atom percent carbon-90 atom percent titanium.

Nitrogen: Titanium forms a nitride, TiN, that melts at about 3,290° C. Nitrogen can be applied by arc melting the titanium or titanium alloy within a nitrogen-containing atmosphere and using an inert electrode such as carbon, or alternatively by fusing a suitable compound such as TiN into the surface. The appropriate composition range is 0.7 atom percent nitrogen-99.3 atom percent titanium to 20 atom percent nitrogen-80 atom percent titanium. The preferred composition is 3 atom percent nitrogen-97 atom percent titanium.

Oxygen: Oxygen can be applied by fusing the titanium or titanium alloy surface in the presence of oxygen, or alternatively, by fusing a suitable compound such as $TiO_2$ into the surface. The appropriate composition range for oxygen is 1 atom percent oxygen-99 atom percent titanium to 5 atom percent oxygen-95 atom percent titanium. The preferred composition is 3 atom percent oxygen-97 atom percent titanium.

Silicon: Silicon forms a very hard and refractory silicide with the formula $Ti_5Si_3$ that melts at 2,130° C. Titanium and $Ti_5Si_3$ undergo eutectic melting at about 1,330° C. and 13 atom percent silicon-87 atom percent titanium. Silicon can be applied as the element or as a compound containing silicon, such as the silicide. The appropriate composition range is 1 atom percent silicon-99 atom percent titanium to 15 atom percent silicon-85 percent titanium. The preferred composition is 8 atom percent silicon-92 atom percent titanium.

Combinations of two or more elements: Combinations of elements can advantageously be fused into the surface of titanium and titanium alloys to effect hardening. Appropriate combinations include binary and multi-component mixtures of boron, carbon, nitrogen, oxygen, and silicon.

Hardening materials also can be added to the molten pool during the surface melting process. The method of feeding of the hardening material is determined by the melting method employed. Appropriate methods include, but are not limited to, feeding of the materials through a hollow electrode during arc melting of the surface, feeding of the materials into the molten pool during electron beam melting of the surface, and feeding of the materials through the plasma torch during plasma melting of the surface.

Hard materials may also be applied advantageously as a distinct surface coating, as in conventional hard surfacing operations. The methods of welding, using wire feed or stick application, are appropriate. Other methods include, but are not limited to, ion implantation, flame, arc, or plasma spraying, electrodeposition, chemical or physical vapor deposition, and other methods familiar to anyone skilled in the art.

While the invention has been described with a certain degree of particularity, it is manifest that many changes may be made in the details of construction and the arrangement of components without departing from the spirit and scope of the disclosure. It is understood that the invention is not limited to the embodiments set forth herein for purposes of exemplification, but is to be limited only by the scope of the appended claims including the full range of equivalency to which each element thereof is entitled.

Thus, there has been shown and described an improved process for forming a hard surface coating on titanium alloys which accomplishes at least all of the stated objects.

We claim:

1. A process for forming a hard surface coating on titanium alloys, comprising:

providing a piece of material comprising titanium having at least a portion of one surface to be hardened;

depositing a hardening material onto said surface to be hardened;

heat sinking said piece of titanium material;

melting said surface to be hardened such that a molten pool is formed of said piece surface and said hardening material whereby upon cooling a hardened surface is formed; and controlling, by heat sinking, the melting depth of said surface to be hardened during said step of melting such that the hardened surface has a depth of 0.31 to 1.24 centimeters.

2. The process for forming a hard surface coating on titanium and titanium alloys of claim 1, further comprising at least one heat-treating step.

3. The process for forming a hard surface coating on titanium and titanium alloys of claim 1, wherein said material piece is formed of a titanium alloy.

4. The process for forming a hard surface coating on titanium and titanium alloys of claim 1, wherein said heat sinking step is accomplished by liquid cooling the back surface of said piece of material.

5. The process for forming a hard surface coating on titanium and titanium alloys of claim 1, wherein said step of heat sinking step comprises securing the back surface of said piece of material to a heat sink.

6. The process for forming a hard surface coating on titanium and titanium alloys of claim 5, further comprising the steps providing an effective heat transfer medium between said heat sink and the back surface of said piece of material.

7. The process for forming a hard surface coating on titanium and titanium alloys of claim 6, wherein said heat transfer medium comprises tin.

8. The process for forming a hard surface coating on titanium and titanium alloys of claim 6, wherein said heat transfer medium comprises indium.

9. The process for forming a hard surface coating on titanium and titanium alloys of claim 6, wherein said heat transfer medium comprises an alloy melting in the range of 50° to 300° C.

10. The process for forming a hard surface coating on titanium and titanium alloys of claim 1, wherein said hardening material comprises boron.

11. The process for forming a hard surface coating on titanium and titanium alloys of claim 1, wherein said hardening material comprises carbon.

12. The process for forming a hard surface coating on titanium and titanium alloys of claim 1, wherein said hardening material comprises nitrogen.

13. The process for forming a hard surface coating on titanium and titanium alloys of claim 1, wherein said hardening material comprises oxygen.

14. The process for forming a hard surface coating on titanium and titanium alloys of claim 1, wherein said hardening material comprises silicon.

15. The process for forming a hard surface coating on titanium and titanium alloys of claim 1, wherein said hardening material is deposited on said surface to be hardened as a slurry.

16. The process for forming a hard surface coating on titanium and titanium alloys of claim 1, wherein said hardening material is deposited on said surface to be hardened by flame spraying.

17. The process for forming a hard surface coating on titanium and titanium alloys of claim 1, wherein said hardening material is deposited on said surface to be hardened by arc spraying.

18. The process for forming a hard surface coating on titanium and titanium alloys of claim 1, wherein said hardening material is deposited on said surface to be hardened by plasma spraying.

19. The process for forming a hard surface coating on titanium and titanium alloys of claim 1, wherein said hardening material is deposited on said surface to be hardened by electrodeposition.

20. The process for forming a hard surface coating on titanium and titanium alloys of claim 1, wherein said hardening material is deposited on said surface to be hardened by chemical vapor deposition.

21. The process for forming a hard surface coating on titanium and titanium alloys of claim 1, wherein said hardening material is deposited on said surface to be hardened by physical vapor deposition.

22. The process for forming a hard surface coating on titanium and titanium alloys of claim 1, wherein said depositing and melting step are repeated a plurality of times.

23. The process for forming a hard surface coating on titanium and titanium alloys of claim 1, wherein said step of melting comprises melting said surface to be hardened by applying an arc thereto.

24. The process for forming a hard surface coating on titanium and titanium alloys of claim 1, wherein said step of melting comprises melting said surface to be hardened by applying a plasma thereto.

25. The process for forming a hard surface coating on titanium and titanium alloys of claim 1, wherein said step of melting comprises melting said surface to be hardened by applying an electron beam thereto.

26. The process for forming a hard surface coating on titanium and titanium alloys of claim 1, wherein said step of melting comprises melting said surface to be hardened by applying a laser thereto.

27. The process for forming a hard surface coating on titanium and titanium alloys of claim 1, wherein said step of melting is performed in an atmosphere comprising inert gas.

28. A process for forming a hard surface coating on titanium or titanium alloys, comprising:

providing a piece of material comprising titanium having at least a portion of one surface to be hardened;

heat sinking said piece of titanium material;

melting said surface to be hardened such that a molten pool is formed;

depositing a hardening material onto said molten pool whereby upon cooling a hardened surface is formed; and controlling, by heat sinking, the melting depth of said surface to be hardened during said step of melting such that the hardened surface has a depth of 0.31 to 1.27 centimeters.

29. The process for forming a hard surface coating on titanium and titanium alloys of claim 28, wherein said step of melting comprises melting said surface to be hardened by applying an arc thereto and said step of depositing comprises feeding said material through a hollow electrode during said arc melting.

30. The process for forming a hard surface coating on titanium and titanium alloys of claim 28, wherein said step of melting comprises melting said surface to be hardened by applying an electron beam thereto and said step of depositing comprises feeding said material into said molten pool during said electron beam melting.

31. The process for forming a hard surface coating on titanium and titanium alloys of claim 28, wherein said step of melting comprises melting said surface to be hardened by applying a plasma thereto and said step of depositing comprises feeding said material through a plasma torch during said plasma melting.

* * * * *